June 21, 1938.  G. W. RUSLER  2,121,510
CABLE TIE OR FASTENING
Filed April 8, 1936   3 Sheets-Sheet 1
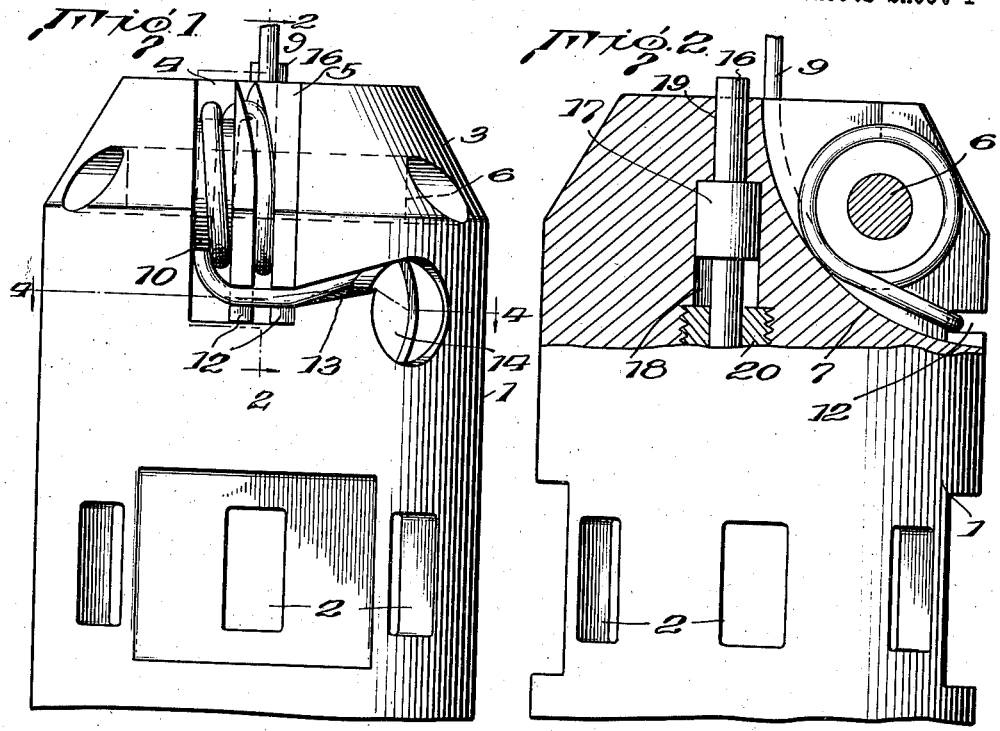
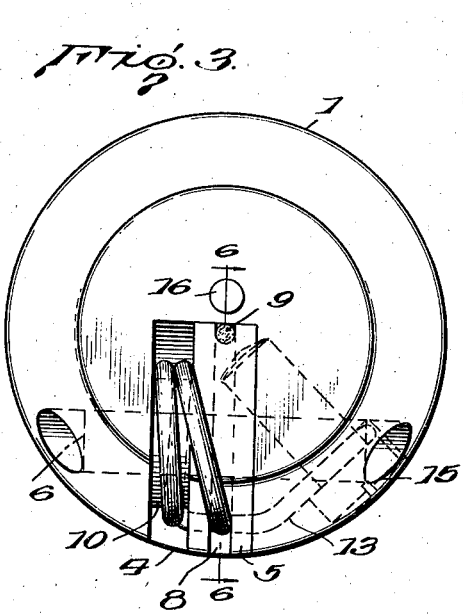
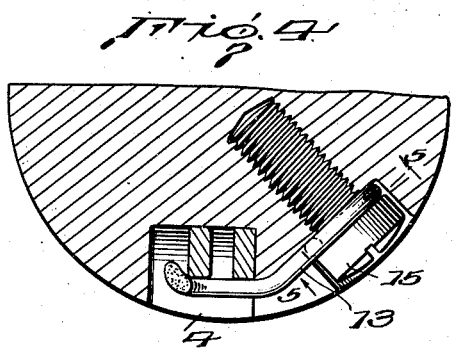
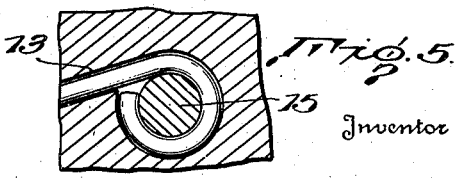
Inventor
G. W. Rusler,
By A. M. Houghton
his Attorney

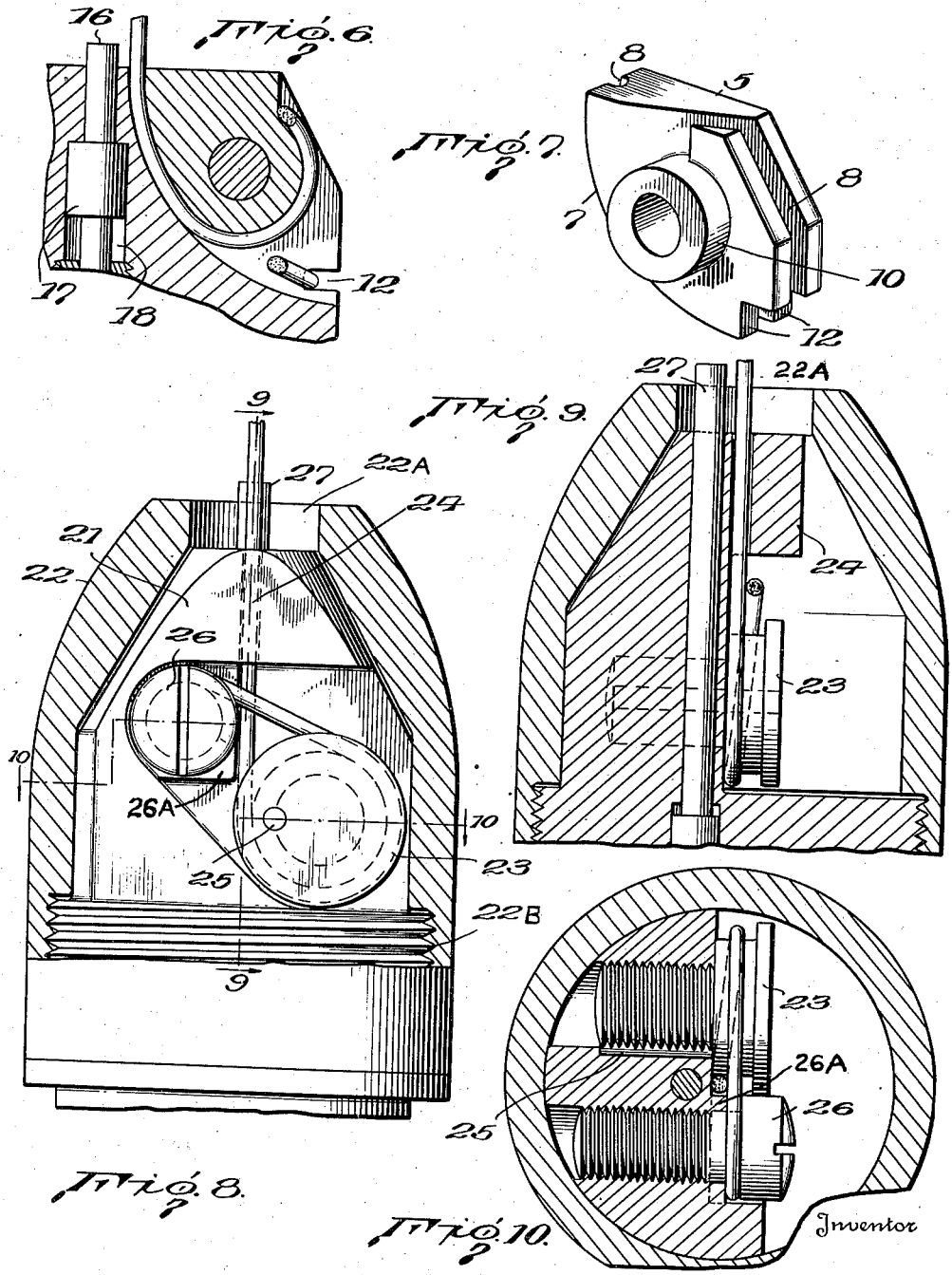

June 21, 1938.   G. W. RUSLER   2,121,510
CABLE TIE OR FASTENING
Filed April 8, 1936   3 Sheets-Sheet 3
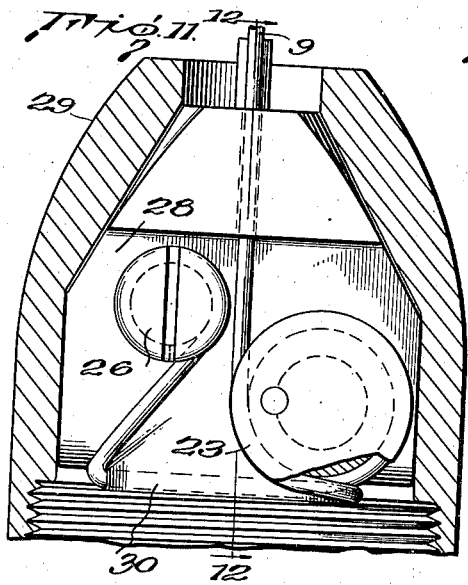
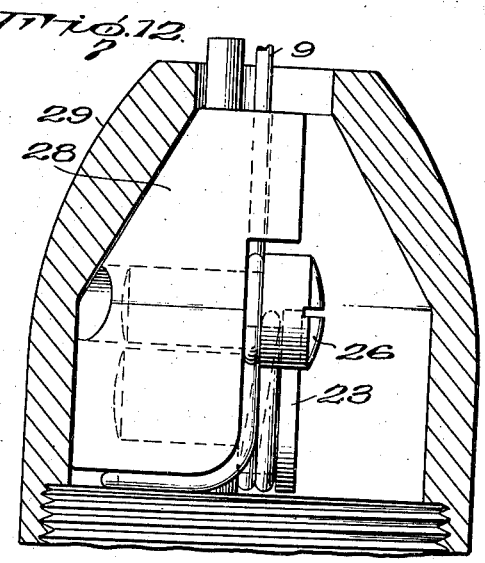
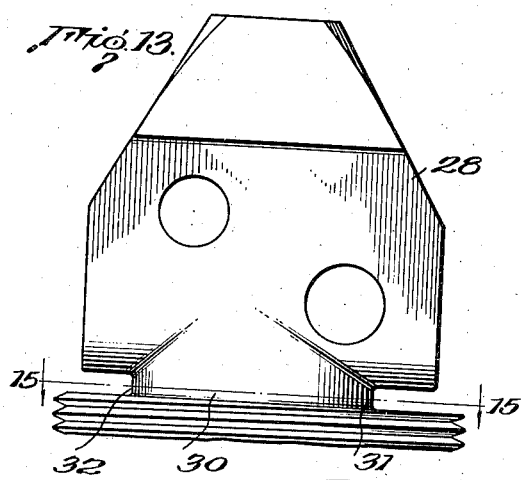
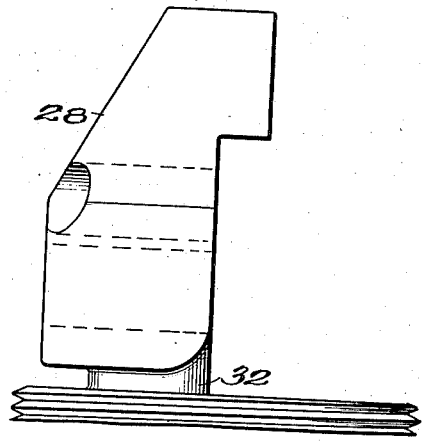
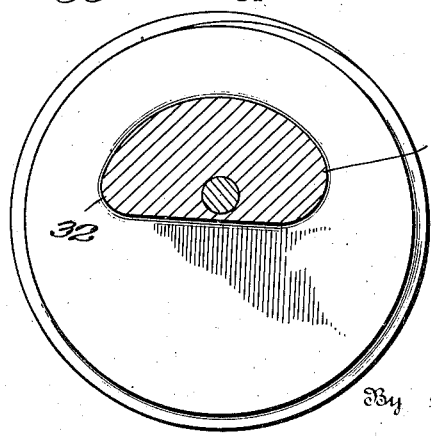
Inventor
G. W. Rusler,
By G. M. Houghton
Attorney Patented June 21, 1938

2,121,510

UNITED STATES PATENT OFFICE 2,121,510

CABLE TIE OR FASTENING

George W. Rusler, Verona, Pa., assignor to Gulf Research & Development Company, Pittsburgh, Pa., a corporation of Delaware Application April 8, 1936, Serial No. 73,386

9 Claims. (Cl. 24—123)

This invention relates to a cable tie or fastening; and particularly to cable ties for instruments or tools and the like to be raised and lowered in oil wells, and it comprises a body portion to which the cable is to be secured, means on the body portion for snubbing the line pull on the cable and for providing a large radius take-off for the cable from the body portion, said means lying advantageously in a plane passing through the longitudinal axis of the cable and arranged for tangential engagement with the cable, and means for positively securing the end of the cable to the body portion without enlarging, swedging or otherwise preparing or altering the end of the cable, all as more fully hereinafter set forth and as claimed.

In known cable fastenings, the cable is usually passed around a pin or through an eyelet and bent sharply against itself, in which position the end of the cable is held by application of a clamp or tightly wrapped wire winding. Sometimes in lieu of sharp bending of the cable, its end is enlarged by leading or swedging and fitted in an opening or depression in a hook block or the like. Often the hook block is constructed of mating parts provided with suitable projections and depressions for engaging the cable.

Sharp bending of the cable such as around a pin results in development in the cable of superimposed bending stresses which greatly weaken the cable and makes necessary the use of large cables in order to obtain the desired factor of safety. The use of auxiliary clamping devices or of wire wrappings at the end of the cable is also disadvantageous in that they do not provide a joint flush with the member to which the cable is connected and because of the number of parts and time required to make the connection. Leading or swedging of the end of the cable is also time consuming and requires tools and experienced labor.

While many of the cable ties of the prior art are satisfactory for most purposes, difficulties have arisen in adapting them for use in raising and lowering instruments and tools and the like in oil wells. This is for the reason that oil wells are necessarily of small bore and are sometimes very deep and the cable used must be small in diameter and yet very strong. The removal of a tool or instrument lost in a well due to breakage of the cable supporting it is very costly. The cable is necessarily of small diameter and the connection therefore that the cable makes with the instrument or tool must be free of sharp bends and further must be capable of being made up quickly and easily since the instrument or tool is frequently disconnected from the cable after each use in the well. When certain instruments are run into a well, a messenger consisting in its simplest form of a short length of pipe, is often sent down the cable to strike a pin or lever on the head of such instruments to cause operation of valves, etc., in the instruments. Thus it becomes necessary to have the cable tie or fastening within or flush with the head of the instrument.

Among the achieved objects of the present invention are: The provision of a cable tie or fastening in which the cable receiving or take-off member is one of large radius as compared with the size of the cable thus minimizing bending stress set up in the cable; the provision of suitable means for snubbing the line pull on the cable to relieve the extreme end of the cable of this pull so that it need not be leaded or swedged or otherwise specially prepared to keep it from pulling loose from its fastening, but may simply be clamped under the head of a screw; the provision of a cable tie requiring simply the use of a screw driver and cutting pliers for making the fastening and which fastening may be quickly and easily made and dismantled; and the provision of a cable tie in which there are no wire wrappings, clamps or other fastening projecting above the point of take-off to interfere with the use of a messenger, as when the tie is used in oil well practice.

Other objects and advantages of the invention will be apparent from the following detail description read in connection with the accompanying drawings wherein for the purpose of illustration the invention is shown as applied to the head of an oil well instrument and wherein:

Fig. 1 is a side elevation of the tie applied to the head of an oil well instrument;

Fig. 2 is a side elevation partly in vertical section taken along line 2—2 of Fig. 1 looking in the direction of the arrows;

Fig. 3 is a top plan shown partly in dotted lines;

Fig. 4 is a fragmental horizontal section taken along line 4—4 of Fig. 1 in the direction of the arrows;

Fig. 5 is a detailed sectional view taken along line 5—5 of Fig. 4 in the direction of the arrows;

Fig. 6 is a detailed sectional view taken along line 6—6 of Fig. 3 in the direction of the arrows;

Fig. 7 is a detailed perspective view of an element of the tie;

Fig. 8 is a side elevation of a modified form of tie with the protecting cap shown partly in vertical section.

Fig. 9 is a vertical section along line 9—9 of Fig. 8 in the direction of the arrows;

Fig. 10 is a horizontal section along line 10—10 of Fig. 8;

Fig. 11 is a side elevation of another modification of the invention with the protecting cap shown in vertical section;

Fig. 12 is a side elevation of the form of invention shown in Fig. 11 with the protecting cap shown in vertical section taken along line 12—12 of Fig. 11 looking in the direction of the arrows.

Fig. 13 is a detail side elevation of the body of the tie shown in Fig. 11;

Fig. 14 is a side elevation of the member shown in Fig. 13 and

Fig. 15 is a horizontal section along line 15—15 of Fig. 13 looking in the direction of the arrows.

Referring to the drawings, wherein like numerals indicate corresponding parts throughout the several views, 1 designates the upper end or head of an oil well instrument of generally cylindrical shape as shown in Fig. 3 and provided with openings 2 for the discharge of oil therefrom. The top end of the instrument is tapered as at 3 and has a deep notch or slotted opening 4 with an arcuate shaped bottom, said opening extending inwardly from the side to a point slightly beyond the center of the head of the instrument. In this notch or slotted opening is seated a cable tie-piece or drum 5 shown in detail perspective in Fig. 7. The member 5 is held in position in the notch by a pin 6 and prevented from turning by its curved sides 7 which correspond with and contact throughout their length with the curved bottom of the notch. Tie-piece 5 is grooved circumferentially as shown at 8 to receive the cable 9 which crosses over onto a small diameter hub portion 10 of the tie-piece. The tie-piece is notched transversely as at 12 for passage of the cable after leaving the hub as will be hereinafter explained. This notch 12 coincides with a similar circumferential notch or groove 13 in the head of the instrument leading to a recess 14 adapted to receive the end of the cable for clamping beneath the head of a set screw 15. 16 is a pin or trigger movable longitudinally in the head of the instrument to operate valves (not shown) in the instrument. This pin is provided with an enlarged mid-section 17 fitted for longitudinal movement of the pin in counterbore 18 of passage 19 in the head. The pin is retained in the head by screw collar 20 which prevents the enlarged portion from leaving counterbore. As shown, the pin is positioned at a point relatively close to the take-off of the cable 9 from the head so that it may receive a direct blow from a messenger sent down the cable as previously described.

The end of the cable is secured to the instrument by threading it down through the groove in the tie-piece and upwards to the crossover where it is wound twice around the small diameter hub on the tie-piece. Leaving the hub the end of the cable is passed through the transverse notch in the heel of the tie-piece and through the circumferential notch or groove in the head of the instrument to the recess containing the set screw, where it is wound once around the body of the screw and the screw tightened to bind the cable under its head.

As will be seen, the line pull on the extreme end of the cable held by the set screw is greatly reduced due to the snubbing of the cable by passage around the small diameter hub on the tie-piece, and that development of superimposed bending stress in the cable is also reduced to a minimum by passage of the cable in the groove 8 which, as shown, radially increases its distance from the center of hub 10 to the top of the head. It will further be seen that there is no bending of the cable above its tangential engagement with the tie-piece and that in bending the cable around the tie-piece the cable is in a plane passing through the longitudinal axis of that part of the cable above the tie.

In Figs. 8, 9 and 10 is illustrated a modified form of the invention wherein the tie-piece serves both as a large radius take-off for the cable and as a snubbing member.

In this modification, head 21 of the instrument is provided with a bullet shaped adjustable cap 22 enclosing the tie. The cap has an enlarged opening 22A at its top for passage of the cable and the end of trigger 27, and is provided at its lower end with an extended threaded portion 22B for engagement with the extended threaded portion on the head of the instrument. The threaded extensions on the cap and on the instrument permit adjustment of the cap relative to the tie so that the cap may be positioned above the end of the trigger and shield or protect it against accidental operation. An advantage of this construction is that the trigger may be set for firing the instrument some distance from the place where the instrument is to be used and before tying the cable thereto, and the cap unscrewed partly or until it extends beyond the trigger to shield and protect it from accidental firing. In this condition the instrument may be transported and handled without danger of accidental operation of the trigger. Immediately before using the instrument the cap is screwed down tight in which position it exposes the end of the trigger for operation by the messenger. There is a further advantage in this construction in that the impact force of the messenger sent down the cable to actuate the trigger when the instrument is in use, as before explained, is largely expended in striking the cap since the diameter of the messenger is greater than the diameter of opening 22A, and any swagging or burring of the metal of the cap around the opening due to the hammering action of the messenger cannot reach the trigger and cause it to bind or stick. The combined take-off and snubbing member designated by the numeral 23, consists of a stud screw provided with a large cylindrical head or drum which serves as a hub or the piece around which the cable is initially wound. The tie-piece is located in a recessed or cut away portion in the side of the head of the instrument as shown and beneath a projection 24 through which the cable is passed. Key 25 locks the tie-piece in position by preventing it from turning. The cable is wound once or twice around the hub of the tie and then is passed at right angles to the length of the cable and wound once around the body of set screw 26, preferably in counter clockwise direction as shown. This set screw as illustrated is substantially diametrically opposite the large cylindrical drum and is on the other side of the cable from the drum. The set screw may, if desirable, be provided with left hand threads to avoid unwinding of the cable about it when the screw is tightened. Tightening of the set screw binds the end of the cable under the screw head and effects fastening of the cable. The portion of the cable passing from the tie-piece 23 to the set screw is prevented from contacting with the vertically disposed part of the cable leading into the tie, by clamping it against an abutment or projection 26A. The thickness of this abutment is equal to or slightly greater than one or two times the diameter of the cable depending upon whether one or two turns of the cable is passed around the tie-piece. This construction avoids sharp bends in the cable which would otherwise occur at the tie-piece, cross-over and set screw. Pin or trigger 27 is substantially identical in construction, location and operation as pin 16 previously described.

In this modification as in the form of the invention first described, the cable tie is beneath the top of the head of the instrument so that it does not interfere with contact of a messenger sent down the cable to operate the trigger pin. It will also be noted that the cable first engages tangentially with the large radius hub of the tie and is snubbed by winding around the hub and the final fastening of the end of the cable under the head of screw 26 is subject to only slight, if any, line pull.

Figs. 11, 12 and 13 illustrate a still further embodiment of the invention. In these figures as in Figs. 8, 9 and 10, the instrument head here designated by the numeral 28 is provided with a cap 29 enclosing the cable tie. The structure of this modification is substantially identical with the structure of Figs. 8, 9 and 10 with the exception that the cable 9, after leaving the drum or tie-piece 23, is wound once around a reduced neck 30 in the head 28 of the instrument below the hub and then bound under the head of set screw 26. In this modification the relatively sharp rounded corners 31 and 32 on the reduced neck portion supplement the snubbing effect of tie-piece 23 to further reduce line pull at the end of the cable held by the set screw.

It will be noted that in the various embodiments of the invention shown in the drawings the point at which the cable first engages or enters the head of the instrument is located so that the longitudinal axis of the cable coincides substantially with the longitudinal axis of the instrument. Thus in practice since the longitudinal axis of the instrument lies substantially in a plane passing through the center of gravity of the instrument, the instrument is centered with respect to the cable.

While the various embodiments of the invention illustrated show its application to instruments used in oil well work, it is obvious that the invention may be used in many other relations where it is desired to secure the end of a cable to a body for the purpose of performing the acts of lowering, raising or pulling, or where the cable is secured to a body and then placed under tension.

What I claim is:—

1. In a cable tie a large radius take-off member, located eccentrically with respect to the central vertical axis of the tie and tangential with respect to the said axis, and about which the cable is adapted to be wound to reduce superimposed bending stress in the cable at the point of take-off of the cable from the tie, means for securing the end of the cable to the tie, and snubbing means positioned within the tie for absorbing the line pull on the cable, said snubbing means being interposed between the cable end securing means and the large radius cable take-off member to reduce the line pull on the cable securing means.

2. A cable tie or fastening for securing oil well instruments and tools or the like to the end of a cable for lowering and raising in a well, comprising a substantially uniform surfaced body portion of substantially uniform diameter, provided with a centrally disposed opening in its top end for reception of the end of a cable, a relatively large radius cable take-off and snubbing member positioned within the confines of the body portion and about which the cable is wound after passage through said opening, the periphery of said member being in tangential alignment with the cable opening, and means also within the confines of said body portion for securing the end of the cable to the body portion after winding around the cable take-off and snubbing member.

3. A cable tie or fastening for securing oil well instruments and tools or the like to the end of a cable for lowering and raising in a well, comprising a substantially uniform surfaced body portion of substantially uniform diameter, provided with a centrally disposed opening in its top end for reception of the end of a cable, a relatively large radius cable take-off and snubbing member positioned within the confines of the body portion about which the cable is wound after passage through said opening, said member being vertically disposed to receive the cable in a plane passing through the longitudinal axis of the cable above the body portion, the periphery of said member being in tangential alignment with the cable opening and means also within the confines of the body portion for securing the end of the cable to the body portion after winding around the cable take-off and snubbing member.

4. A cable tie comprising a body member provided with a cable opening, a grooved, large radius cable take-off member mounted on said body member in tangential communication with the cable opening, a hub member of relatively small diameter on the take-off member, the groove in the take-off member being adapted to receive a cable and direct it onto the hub member for winding around the hub member, and means for securing the end of the cable to the body member after winding around the hub.

5. A cable tie or fastening for securing oil well instruments and tools or the like to the end of a cable for lowering and raising in a well, said tie comprising a body portion provided with a cable opening in its top and a recess in its side, a relatively large radius cable receiving and take-off member in said recess eccentrically located in the body portion and in tangential alignment with the opening for the cable in the top of the body portion, means in said recess for firmly securing the end of the cable to the body portion and snubbing means for the cable positioned intermediate the cable end securing means and the large radius cable receiving and take-off member.

6. A cable tie or fastener comprising a member having a downwardly extending opening in the top through which the cable is passed, a cable receiving element adjacent the opening, eccentrically located with respect to the central vertical axis of said member and having a curved surface in tangential alignment with the opening and over which the cable is wound, a hub-like projection on the face of said element over which the cable is wound after winding around said element, and a separate clamping device in said member for securing the end of the cable to the member.

7. A cable tie or fastener comprising a member provided with a slotted opening extending across the top face thereof to the center and part way down the side thereof, said opening having a curved bottom, a grooved cable receiving element in said opening, the walls of the groove in said element and the bottom wall of said opening defining a curved passageway through which the cable is threaded for winding around the element, a hub-like projection on a face of the element over which the cable is wound after winding around the element, and separate clamping means in said member for the end of the cable.

8. In a cable tie or fastening for securing oil well instruments, tools and the like to a supporting cable, a head open at the top for reception of a cable and provided with a rounded annular cable-retaining groove, a large radius take-off member on the side of the head, located above the groove and located eccentrically with respect to the central vertical axis of the head and in tangential alignment with the cable opening, and means for attaching the cable end to the head; the cable passing through the top opening, around the take-off member, around the groove and thence to the fastening means.

9. In a cable tie, a body member open at the top, a large radius gently-curved cable take-off and receiving member below said open top, fixed to the body member, adapted to have the cable wound over it and eccentrically located with respect to the central vertical axis of the body member and substantially tangent to said axis so as to receive the cable tangentially, and means for attaching the cable to the body member after its passage around the take-off member.

GEORGE W. RUSLER.